United States Patent
Lee et al.

(10) Patent No.: US 7,684,393 B2
(45) Date of Patent: Mar. 23, 2010

(54) VOID-FILLING IN AN OPTICAL BURST SWITCHING SYSTEM USING CONSTANT OFFSET

(75) Inventors: Seoung Young Lee, Yuseong-Gu (KR); In Yong Hwang, Yuseong-Gu (KR); Hong Shik Park, Yuseong-Gu (KR)

(73) Assignee: Research and Industrial Cooperation Group, Daejeon-shi (KR)

( * ) Notice: Subject to any disclaimer, the term of this patent is extended or adjusted under 35 U.S.C. 154(b) by 947 days.

(21) Appl. No.: 11/409,596

(22) Filed: Apr. 24, 2006

(65) Prior Publication Data

US 2007/0177588 A1  Aug. 2, 2007

(30) Foreign Application Priority Data

Jan. 27, 2006  (KR) .................... 10-2006-0008839

(51) Int. Cl.
  *H04J 14/00* (2006.01)
(52) U.S. Cl. .......................... 370/389; 398/54
(58) Field of Classification Search ................. 370/389; 398/45, 54
  See application file for complete search history.

(56) References Cited

U.S. PATENT DOCUMENTS

2006/0140184 A1* 6/2006 Youn et al. ............. 370/389
2006/0165079 A1* 7/2006 Rodrigo .................. 370/389
2007/0212065 A1* 9/2007 Shin et al. ................ 398/45

* cited by examiner

*Primary Examiner*—Jayanti K Patel
*Assistant Examiner*—Matthew Campbell
(74) *Attorney, Agent, or Firm*—The Webb Law Firm

(57) ABSTRACT

Provided is a method for transmitting a burst in an optical burst switching system, in which when a burst is generated at an originating node, a burst control packet is transmitted to a destination node by way of a plurality of nodes and then a data burst is transmitted after a pre-allocated offset time. The method includes the steps of obtaining an arrival time of data bursts that survive competition to occupy an output channel among data bursts transmitted to the next node by way of the current node using offset time information in burst control packets for the survived data bursts, checking whether an empty void is present between the survived data bursts by using the obtained arrival time of the survived data bursts, and generating a new data burst originating from the current node, inserting the newly generated data burst into the checked empty void, and transmitting to the next node. This method can improve channel utilization and maximize performance of the optical burst switching system.

3 Claims, 4 Drawing Sheets

(a)

(b)

(c)

(d)

(a)

(b)

(c)

(d)

VOID-FILLING IN AN OPTICAL BURST SWITCHING SYSTEM USING CONSTANT OFFSET

BACKGROUND OF THE INVENTION

1. Field of the Invention

The present invention relates to a method for transmitting a burst in an optical burst switching system, and more particularly, to a method for transmitting a burst in an optical burst switching system that is capable of improving channel utilization and thus maximizing system performance by inserting and transmitting a data burst which originates from a current node and whose destination is a next node, into an empty void between data bursts that survive competition to occupy an output channel among data bursts transmitted to the next node by way of the current node.

2. Description of the Related Art

In a conventional optical burst switching system, a burst control packet (BCP) is first transmitted when a burst is generated. After a certain time elapses, a data burst (DB), which is a burst for transmitting real data, is transmitted. This time difference is called an offset time.

Such method for transmitting a burst in an optical burst switching system has been designed so that a data burst transmitted to a next node by way of a current node, i.e., a transit data burst (TDB), and a data burst originating from the current node, attempt to occupy an output channel at the same time, wherein the data burst having the longer offset time is more likely to actually occupy the output channel.

FIG. 1 is a conceptual diagram illustrating a process in which data bursts (DBs) transiting a node compete with one another to occupy an output channel in a typical optical burst switching system. In the example illustrated, data bursts input through three input channels C1 to C3 compete with one another to occupy one output channel C4.

Referring to FIG. 1, a first arriving data burst DB occupies the output channel C4 first. In this case, X indicates a data burst DB that loses the channel competition and undergoes loss. The offset times $t_{offset}$ of all the input data bursts DBs are all the same. This allows the data bursts to compete with one another on even ground to occupy the output channel C4.

Meanwhile, an empty void is present between surviving data bursts (SDBs) that survive the competition to occupy the output channel C4.

In conventional art, however, such an empty void between survived data bursts is not well utilized. This degrades channel utilization and system performance.

SUMMARY OF THE INVENTION

It is an object of the present invention to provide a method for transmitting a burst in an optical burst switching system, which is capable of improving channel utilization and maximizing system performance by inserting and transmitting a data burst which originates from a current node and whose destination is a next node, into an empty void between data bursts that survive competition to occupy an output channel among data bursts transmitted to the next node by way of the current node.

According to an aspect of the present invention, there is provided a method for transmitting a burst in an optical burst switching system, in which when a burst is generated at an originating node, a burst control packet is transmitted to a destination node by way of a plurality of nodes and then a data burst is transmitted after a pre-allocated offset time, the method comprising the steps of: (a) obtaining an arrival time of data bursts that survive competition to occupy an output channel among data bursts transmitted to the next node by way of the current node by using offset time information in burst control packets for the survived data bursts; (b) checking whether an empty void is present between the survived data bursts by using the obtained arrival time of the survived data bursts; and (c) generating a new data burst originating from the current node, inserting the newly generated data burst into the checked empty void, and transmitting to the next node.

Step (c) may comprise the steps of: when the burst control packet for a next survived data burst arrives by a time corresponding to the end of a current survived data burst, inserting the newly generated data burst into the checked empty void and transmitting to the next node; and when the burst control packet for the next survived data burst does not arrive by the time corresponding to the end of the current survived data burst, inserting the new data burst into the checked empty void starting from the end of the current survived data burst, and transmitting to the next node, with a maximum length of the new data burst limited by the offset time of the survived data burst.

The newly generated data burst may be a data burst which has no data control packet and whose destination is the next node.

When inserted into the checked empty void, the newly generated data burst may be inserted starting from the end of the survived data burst.

A maximum length of the newly generated data burst may be limited to a maximum length of the checked empty void.

DETAILED DESCRIPTION OF EXEMPLARY EMBODIMENTS

The present invention will now be described more fully with reference to the accompanying drawings, in which exemplary embodiments of the invention are shown.

Figure 1:
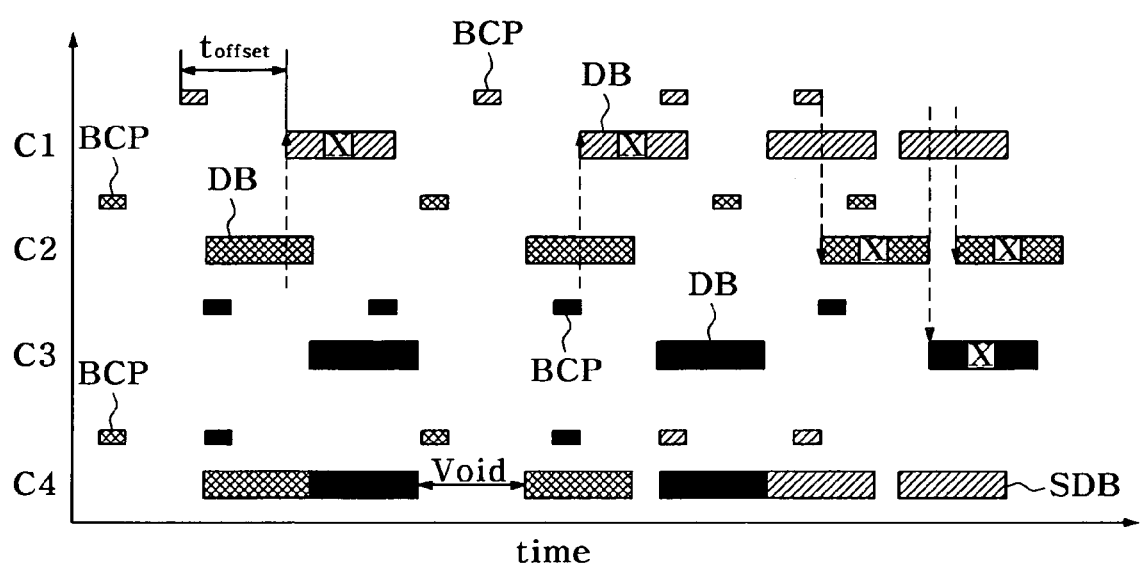
FIG. 1 is a conceptual diagram illustrating a process in which data bursts transiting a node compete with one another to occupy an output channel in a typical optical burst switching system.
Figure 2:
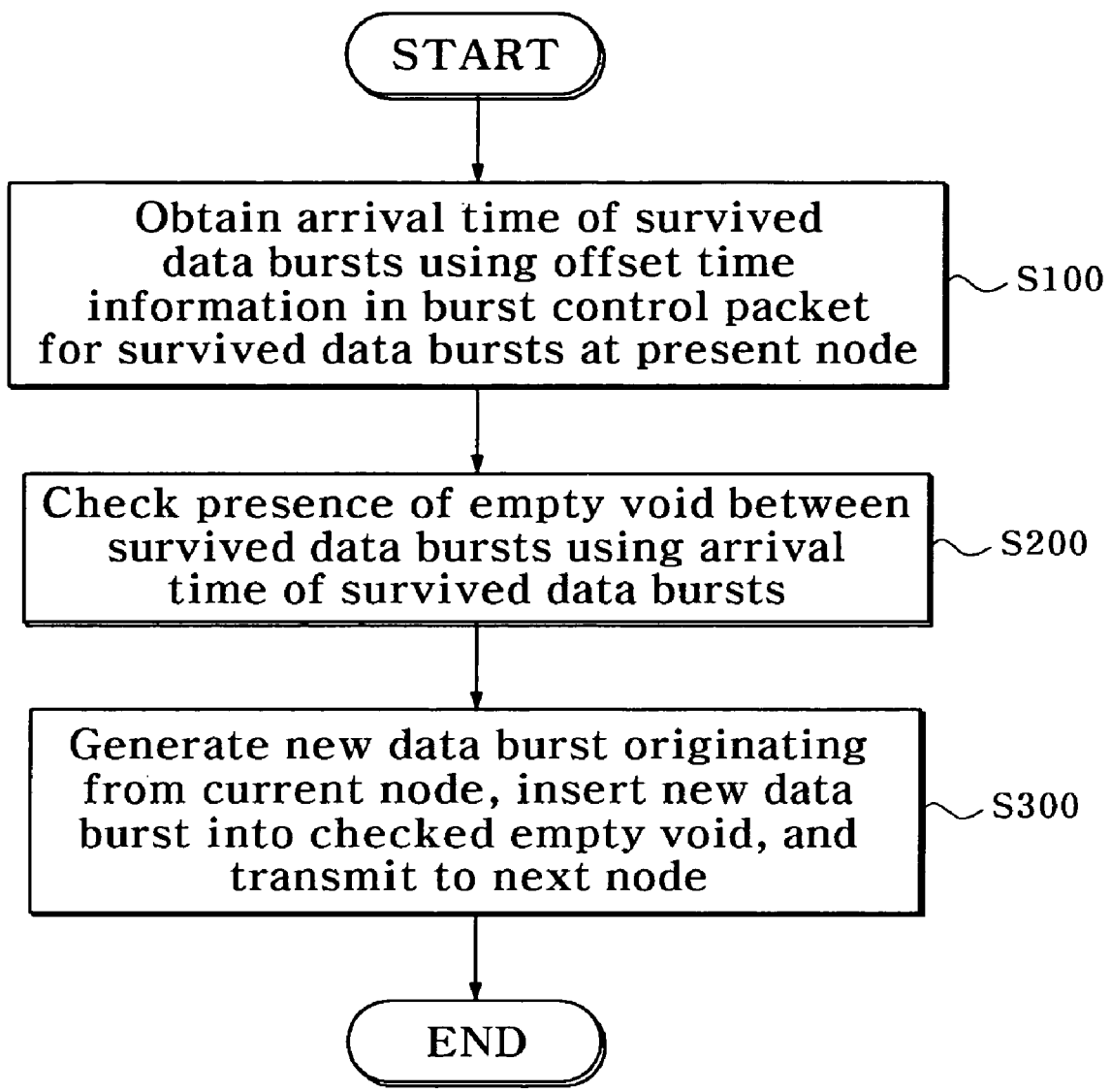
FIG. 2 is a flowchart illustrating a method for transmitting a burst in an optical burst switching system according to an exemplary embodiment of the present invention.

FIG. 2 is a flowchart illustrating a method for transmitting a burst in an optical burst switching system according to an exemplary embodiment of the present invention.

Referring to FIG. 2, an arrival time of data bursts that survive competition to occupy an output channel among data bursts transmitted to a next node by way of a current node is obtained using offset time information in burst control packets for the survived data bursts (S100).

The presence of an empty void between the survived data bursts is then checked using the obtained arrival time of the survived data bursts (S200).

A new data burst originating from the current node is then generated. The new data burst is inserted into the checked empty void and transmitted to the next node (S300).

At this time, if a burst control packet for the next survived data burst arrives by a time corresponding to the end of the current survived data burst, the newly generated data burst is inserted into the checked empty void and transmitted to the next node.

On the other hand, if the burst control packet for the next survived data burst does not arrive by the time corresponding to the end of the current survived data burst, a maximum length of the new data burst is preferably limited by the offset time of the current survived data burst.

Preferably, the newly generated data burst has no data control packet and is destined for the next node.

Preferably, when the newly generated data burst is inserted into the checked empty void, it is inserted by starting from the end of the survived data burst.

Preferably, the maximum length of the newly generated data burst is limited to the maximum length of the checked empty void.

Figure 3:
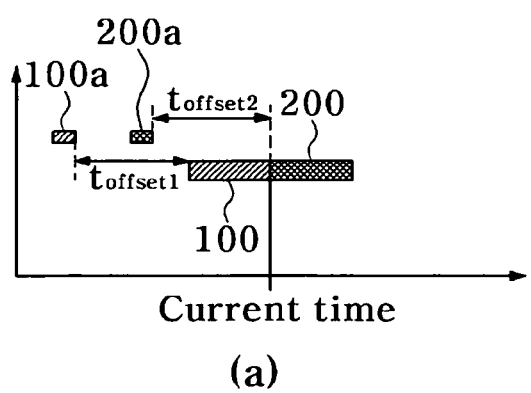
FIG. 3 is a conceptual diagram illustrating a method for transmitting a burst in an optical burst switching system according to an exemplary embodiment of the present invention.
Figure 3:
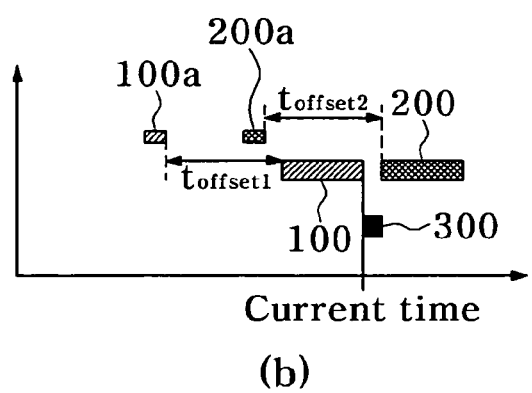
Figure 3:
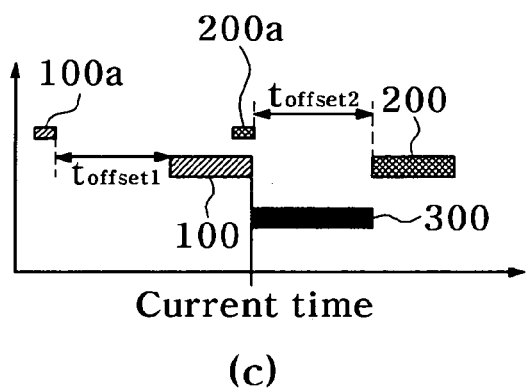
Figure 3:
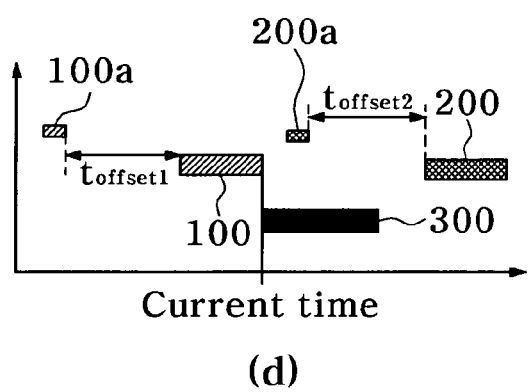

FIG. 3 is a conceptual diagram illustrating a method for transmitting a burst in an optical burst switching system according to an exemplary embodiment of the present invention.

Referring to FIG. 3, when a first burst control packet 100a for a first arriving data burst 100 arrives at a current node, an arrival time of the first data burst 100 is obtained using the first offset time $t_{offset1}$ information in the first burst control packet 100a.

A determination is then made as to whether a current time corresponds to the end of the first data burst 100. If the current time is equal to the end of the first data burst 100, it is checked whether a second burst control packet 200a for a second, subsequently arriving data burst 200 arrives.

If the second burst control packet 200a for the second data burst 200 arrives prior to the current time, an arrival time of the second data burst 200 is obtained by using the second offset time $t_{offset2}$ information in the second burst control packet 200a.

It can now be checked whether an empty void is present between the first and second data bursts 100 and 200 by using the obtained arrival time of the first and second data bursts 100 and 200.

FIG. 3 (a) to (c) shows that the second burst control packet 200a for the second data burst 200 arrives prior to the current time. As described above, the arrival time of the first and second data bursts 100 and 200 can be obtained by using the first and second offset time $t_{offset1}$ and $t_{offset2}$ information in the first and second burst control packets 100a and 200a for the first and second data bursts 100 and 200. Using the arrival time, it can be checked whether the empty void is present between the first and second data bursts 100 and 200.

After it is checked whether the empty void is present between the first and second data bursts 100 and 200 as described above, a new data burst 300 originating from the current node, i.e., a data burst which has no data control packet and whose destination is the next node, is generated, inserted starting from the end of the first data burst 100, and transmitted to the next node when the empty void is present between the first and second data bursts 100 and 200 (see FIGS. 3 (b) and (c)).

The length of the newly generated data burst 300 can be freely adjusted within the length of the checked empty void. Preferably, the maximum length of the newly generated data burst 300 is limited to the maximum length of the checked empty void.

FIG. 3 (d) shows that the second burst control packet 200a for the second data burst 200 does not arrive prior to the current time, and thus the arrival time of the second data burst 200 cannot be obtained.

Preferably, the size of the newly generated data burst 300 is limited to the first offset time $t_{offset1}$ of the first data burst 100. This is because the second data burst 200 does not arrive prior to at least the first offset time $t_{offset1}$.

As described above, it is possible to improve the performance of the optical burst switching system by inserting the new data burst 300 into the empty void between the first and second data bursts 100 and 200 and transmitting it to the next node.

Figure 4:
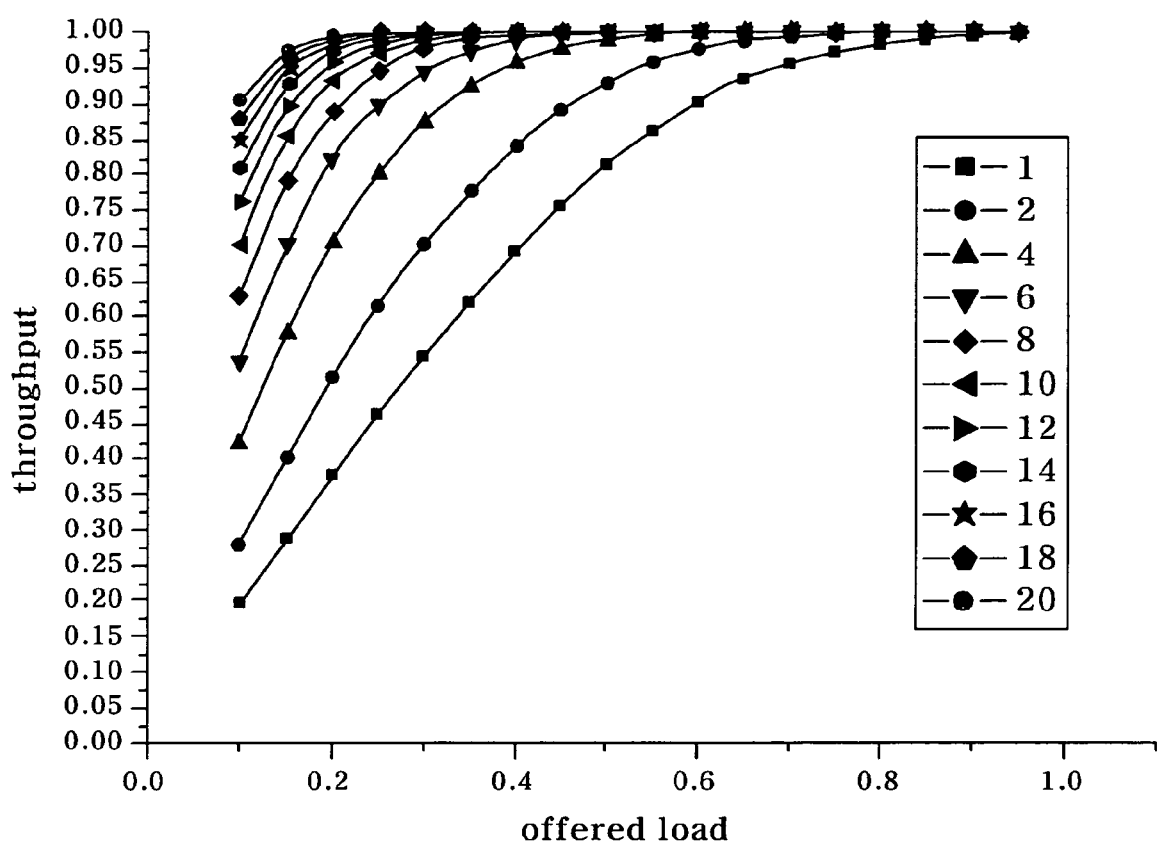
FIG. 4 is a graph illustrating a maximum channel usage rate that can be obtained by the method for transmitting a burst in an optical burst switching system according to an exemplary embodiment of the present invention.

FIG. 4 is a graph illustrating a maximum channel usage rate that can be obtained by the method for transmitting a burst in an optical burst switching system according to an exemplary embodiment of the present invention. It shows an occupancy rate of the optical burst switching system calculated after applying a typical traffic theory to the system.

Referring to FIG. 4, 1, 2, 4, 6, ..., and 20 indicate offset time ratios with respect to an average length of the survived data burst. For example, "1" indicates that the average length of the survived data burst is the same as the offset time length, and "2" indicates that the offset time length is two times the average length of the survived data burst.

It can be seen from throughput calculation for each case that throughput performance becomes higher as an offered load of the data burst transmitted to the next node by way of the current node, i.e., the survived data burst SDB increases. In particular, it can be seen that performance is substantially saturated when the offset time is 10 or greater.

The increased, unlimited offset time improves system performance but increases the delay in the optical burst switching system. To overcome this shortcoming, a compromise should be made between the offset time and the packet delay.

According to the method for transmitting a burst in an optical burst switching system as described above, it is possible to improve channel utilization and maximize system performance by inserting and transmitting a data burst which originates from a current node and whose destination is a next node, into an empty void between data bursts that survive competition to occupy an output channel among data bursts transmitted to the next node by way of the current node.

While the present invention has been described with reference to exemplary embodiments thereof, it will be understood by those skilled in the art that various changes in form and detail may be made therein without originated from the scope of the present invention as defined by the following claims.

What is claimed is:

1. A method for generating and transmitting data bursts, whose destinations nodes are next nodes, in an optical burst switching system, in which when transit bursts are generated at an originating node, burst control packets are transmitted to a destination node by way of a plurality of nodes and then transit data bursts are transmitted after a pre-defined constant offset time, the method comprising the steps of:

(a) obtaining an arrival time of survived transit data bursts that were survived in competition to occupy an output channel among previous transit data bursts transmitted to the next node by way of the current node by using the pre-defined constant offset time in burst control packets for the survived transit data bursts;

(b) checking whether an empty void among survived transit data bursts is present between the survived transit data bursts by using the obtained arrival time of the survived transit data bursts; and (c) generating a new data burst originating from the current node, inserting the newly generated data burst into the checked empty void, and transmitting the data burst whose destination node is the next node, wherein step (c) comprises the steps of:

when the burst control packet for a next survived transit data burst arrives by a time corresponding to the end of a current survived transit data burst, inserting the newly generated data burst without a burst control packet into the checked empty void and transmitting the newly generated data burst whose destination node is the next node; and when the burst control packet for the next survived transit data burst does not arrive by the time corresponding to the end of the current survived transit data burst, inserting the newly generated data burst without a burst control packet into the checked empty void starting from the end of the current survived transit data burst, and transmitting the newly generated data burst whose destination node is the next node, with a maximum length of the newly generated data burst limited by the offset time of the current survived transit data burst.

2. The method according to claim 1, wherein when inserted into the checked empty void, the newly generated data burst is inserted from the end of the survived transit data burst.

3. The method according to claim 1, wherein a maximum length of the newly generated data burst is limited by the offset time of the current survived data transit burst.

* * * * *